(12) United States Patent
Koshiyama

(10) Patent No.: US 8,082,069 B2
(45) Date of Patent: Dec. 20, 2011

(54) INFORMATION PROCESSING APPARATUS AND METHOD OF CONTROLLING COOLING FAN

(75) Inventor: Satoshi Koshiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 12/388,070

(22) Filed: Feb. 18, 2009

(65) Prior Publication Data

US 2009/0242186 A1 Oct. 1, 2009

(30) Foreign Application Priority Data

Mar. 27, 2008 (JP) ................................ 2008-084715

(51) Int. Cl.
*G06F 19/00* (2011.01)
(52) U.S. Cl. .............. 700/299; 700/19; 700/32; 700/33; 700/300; 165/287; 165/299
(58) Field of Classification Search ..................... 700/19, 700/32, 33, 299, 300; 165/287, 299
See application file for complete search history.

(56) References Cited

U.S. PATENT DOCUMENTS

| 5,805,403 | A  | * | 9/1998  | Chemla ........................ 361/103 |
| 6,101,459 | A  | * | 8/2000  | Tavallaei et al. .............. 702/132 |
| 6,134,667 | A  | * | 10/2000 | Suzuki et al. ................. 713/300 |
| 6,487,463 | B1 | * | 11/2002 | Stepp, III ........................ 700/79 |
| 6,735,499 | B2 | * | 5/2004  | Ohki et al. .................... 700/299 |
| 6,888,332 | B2 | * | 5/2005  | Matsushita .................... 318/471 |
| 7,219,247 | B2 | * | 5/2007  | Law et al. ..................... 713/322 |
| 7,290,721 | B2 | * | 11/2007 | Cheng .......................... 236/49.3 |
| 7,836,717 | B2 | * | 11/2010 | Liao et al. .................... 62/259.2 |
| 2006/0266510 | A1 |   | 11/2006 | Nobashi |
| 2007/0142976 | A1 | * | 6/2007  | Tezuka ......................... 700/300 |

FOREIGN PATENT DOCUMENTS

JP 2006-330913 12/2006
JP 2007-226617 9/2007

* cited by examiner

*Primary Examiner* — Michael D Masinick
(74) *Attorney, Agent, or Firm* — Oblon, Spivak, McClelland, Maier & Neustadt, L.L.P.

(57) ABSTRACT

An information processing apparatus includes a device detecting section that detects a heating device provided in a housing; a device determining section that determines the type of the heating device detected by the device detecting section; a sensor selecting section that selects a predetermined one of a plurality of temperature sensors provided in the housing in accordance with existence/absence of the heating device and the type of the heating device; and a fan controlling section that controls the number of rotations of a cooling fan provided in the housing in accordance with a measured temperature of the temperature sensor selected by the sensor selecting section.

10 Claims, 14 Drawing Sheets

| LEVEL | TEMPERATURE RANGE || NUMBER OF ROTATIONS OF COOLING FAN (%) |
| | LOWER-LIMIT TEMPERATURE | UPPER-LIMIT TEMPERATURE | |
| --- | --- | --- | --- |
| 1 | −128°C | 60°C | 50% |
| 2 | 50°C | 70°C | 75% |
| 3 | 60°C | 127°C | 100% |

| AREA NAME | TEMPERATURE SENSOR REGISTRATION INFORMATION | COOLING FAN REGISTRATION INFORMATION |
|---|---|---|
| AREA 1 (BASIC SETTING) | TEMPERATURE SENSOR 326A<br>TEMPERATURE SENSOR 326B<br>TEMPERATURE SENSOR 326C<br>TEMPERATURE SENSOR 326D | COOLING FAN 328A<br>COOLING FAN 328B<br>COOLING FAN 328C |
| AREA 2 | NONE | COOLING FAN 328D |
| AREA 3 | TEMPERATURE SENSOR 330Z (OPTION BOARD 330) | COOLING FAN 328D |
| ... | ... | ... |
| AREA N | TEMPERATURE SENSOR B22 (OPTION BOARD B10) | COOLING FAN 328C<br>COOLING FAN 328D<br>COOLING FAN B20 (OPTION BOARD B10) |

FIG. 10A

| LEVEL | TEMPERATURE RANGE | | NUMBER OF ROTATIONS OF COOLING FAN (%) |
|---|---|---|---|
| | LOWER-LIMIT TEMPERATURE | UPPER-LIMIT TEMPERATURE | |
| 1 | −128°C | 60°C | 50% |
| 2 | 50°C | 70°C | 75% |
| 3 | 60°C | 127°C | 100% |

FIG. 10B

| LEVEL | TEMPERATURE RANGE | | NUMBER OF ROTATIONS OF COOLING FAN (%) |
|---|---|---|---|
| | LOWER-LIMIT TEMPERATURE | UPPER-LIMIT TEMPERATURE | |
| 1 | −128°C | 127°C | 50% |

FIG. 10C

| LEVEL | TEMPERATURE RANGE | | NUMBER OF ROTATIONS OF COOLING FAN (%) |
|---|---|---|---|
| | LOWER-LIMIT TEMPERATURE | UPPER-LIMIT TEMPERATURE | |
| 1 | −128°C | 45°C | 50% |
| 2 | 35°C | 59°C | 75% |
| 3 | 49°C | 127°C | 100% |

FIG. 10D

| LEVEL | TEMPERATURE RANGE | | NUMBER OF ROTATIONS OF COOLING FAN (%) |
|---|---|---|---|
| | LOWER-LIMIT TEMPERATURE | UPPER-LIMIT TEMPERATURE | |
| 1 | −128°C | 50°C | 50% |
| 2 | 40°C | 60°C | 60% |
| 3 | 50°C | 70°C | 75% |
| 4 | 60°C | 127°C | 100% |

INFORMATION PROCESSING APPARATUS AND METHOD OF CONTROLLING COOLING FAN

BACKGROUND OF THE INVENTION

1. Field of the Invention

The present invention relates to an information processing apparatus and a method of controlling a cooling fan.

2. Description of the Related Art

In recent years, technologies of manufacturing semiconductor chips are rapidly being developed, so that integration of integrated-circuit components of, for example, integrated circuits (ICs) or large-scale integrated circuits (LSIs) has considerably increased. This has caused the heating density of semiconductor chips to increase considerably. In particular, semiconductor chips, mounted to, for example, high-performance information processing apparatuses, have very high heating values because they operate on the basis of a high clock. Therefore, a technology that efficiently cools semiconductor chips used in, for example, high-performance information processing apparatuses is demanded.

With regard to such a cooling technology, for example, Japanese Unexamined Patent Application Publication No. 2006-330913 (Patent Document 1) discusses an information processing apparatus including a plurality of heating elements and capable of controlling the number of rotations of cooling fans in accordance with measured temperatures of respective heating elements. This cooling technology relates to a technology of controlling cooling fans when a plurality of heating elements exist, and when the cooling fans and the heating elements are not provided in a one-to-one correspondence. In addition, this cooling technology discussed in Patent Document 1 relates to a cooling fan provided in a housing of a notebook personal computer.

SUMMARY OF THE INVENTION

When the structure of the interior of a housing is changed due to setting or removing an additional structure, such as an option board (one example of a heating device) provided in the housing of the information processing apparatus, the number and positions of heating elements may change, or a path of air in the interior of the housing may change. Therefore, a technology which can dynamically adapt a cooling structure to this change is demanded. However, even if the technology discussed in Patent Document 1 or a related technology, or a combination of these technologies is applied, it is difficult to dynamically change the cooling structure in accordance with the change in the structure of the interior of the housing.

It is desirable to provide a novel and improved information processing apparatus and method of controlling a cooling fan, which can achieve a cooling structure adapted to a changed structure of the interior of a housing by dynamically switching the cooling structure in accordance with whether or not a heating device is set in the housing or the type of heating device that is set.

According to an embodiment of the present invention, there is provided an information processing apparatus including a device detecting section that detects a heating device provided in a housing; a device determining section that determines the type of the heating device detected by the device detecting section; a sensor selecting section that selects a predetermined one of a plurality of temperature sensors provided in the housing in accordance with existence/absence of the heating device and the type of the heating device; and a fan controlling section that controls the number of rotations of a cooling fan provided in the housing in accordance with a measured temperature of the temperature sensor selected by the sensor selecting section.

In the information processing apparatus, the device detecting section detects the heating device provided in the housing. In addition, in the information processing apparatus, the device determining section determines the type of heating device detected by the device detecting section. Further, in the information processing apparatus, the sensor selecting section selects a predetermined one of the plurality of temperature sensors provided in the housing in accordance with the existence/absence of the heating device and the type of heating device. Accordingly, the detecting unit that detects the measured temperature, which becomes a standard when controlling a cooling fan, is dynamically switched in accordance with a change in structure resulting from setting or removing the heating device. In the information processing apparatus, the fan controlling section controls the number of rotations of the cooling fan provided in the housing in accordance with the measured temperature of the temperature sensor selected by the sensor selecting section.

When the device detecting section detects the heating device, and determines that the heating device is one having a high heating value or a low heat-resistance temperature, the fan controlling section may increase the number of rotations of the cooling fan that is driven for cooling the heating device.

When the device detecting section detects the heating device, and determines that the heating device is provided with a temperature sensor, the sensor selecting section may select at least the temperature sensor of the heating device as the predetermined temperature sensor.

When the device detecting section detects the heating device, and determines that the heating device is provided with a cooling fan, the fan controlling section may control at least the number of rotations of the cooling fan of the heating device.

Setting items may be provided in accordance with the existence/absence of the heating device and types of the heating device. In addition, the information processing apparatus may further include a storage section in which a device control table and a temperature/number-of-rotations table are recorded for each of the setting items, the device control table including a combination of the cooling fan and the temperature sensors, the temperature/number-of-rotations table including predetermined temperature ranges and the numbers of rotations of the cooling fan, which are made to correspond to each other. In this case, the sensor selecting section may be formed so as to select the temperature sensor on the basis of the device control table. Further, the fan controlling section may be formed so as to control the number of rotations of the cooling fan on the basis of the temperature/number-of-rotations table, the number of rotations of the cooling fan pertaining to the setting item that is the same as that of the temperature sensor selected by the sensor selecting section.

According to another embodiment of the present invention, there is provided a method of controlling a cooling fan. The method includes the steps of detecting a heating device provided in a housing of the information processing apparatus; determining the type of the heating device detected in detecting the device; selecting a predetermined one of a plurality of temperature sensors provided in the housing in accordance with existence/absence of the heating device and the type of the heating device; and controlling the number of rotations of the cooling fan provided in the housing in accordance with a measured temperature of the temperature sensor selected in the step of selecting the sensor.

According to according to still another embodiment of the present invention, there is provided a program for controlling the cooling fan with a computer. In addition, according to still another embodiment of the present invention, there is provided a recording medium on which the program is recorded.

As described above, according to the embodiments of the present invention, it is possible to achieve a cooling structure adapted to a changed structure of the interior of the housing by dynamically switching the cooling structure in accordance with whether or not a heating device is set in the housing or the type of heating device that is set.

BRIEF DESCRIPTION OF THE DRAWINGS

FIG. 9 illustrates an exemplary structure of an area control table according to the embodiment;

FIG. 10A illustrates an exemplary structure of a fan control table according to the embodiment;

FIG. 10B illustrates an exemplary structure of another fan control table according to the embodiment;

FIG. 10C illustrates an exemplary structure of still another fan control table according to the embodiment;

FIG. 10D illustrates an exemplary structure of still another fan control table according to the embodiment;

DESCRIPTION OF THE PREFERRED EMBODIMENT

Figure 1:
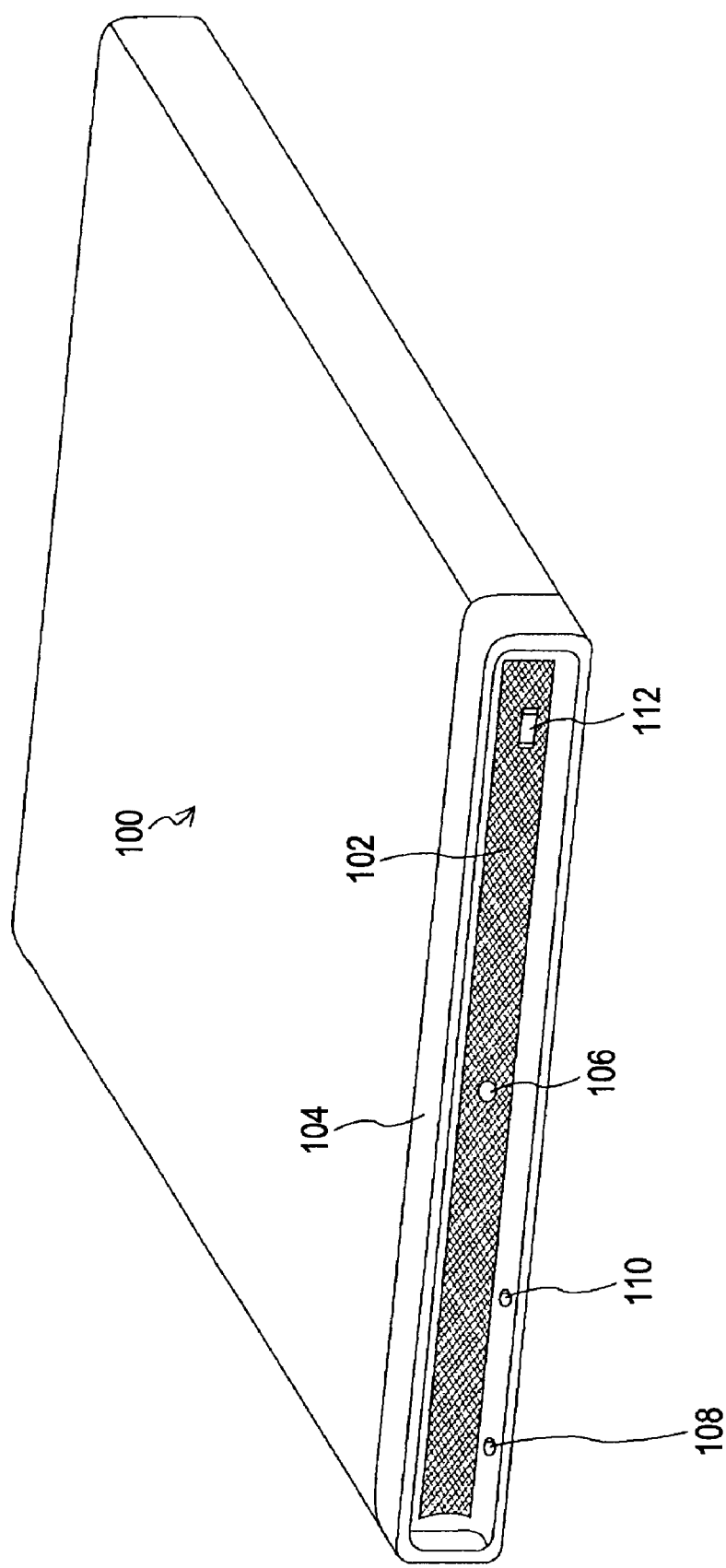
FIG. 1 is an external view of an information processing apparatus according to an embodiment of the present invention.

A preferred embodiment of the present invention will hereunder be described in detail with reference to the attached drawings. In the specification and the drawings, structural elements having essentially the same functional structures will be given the same reference numerals, so that the same descriptions will not be repeated.

Embodiment

A technology according to an embodiment of the present invention will hereunder be described. The embodiment relates to a technology of dynamically switching a combination of cooling fans and temperature sensors used in temperature control in accordance with whether or not an option board is set in a housing. In addition, the technology according to the embodiment relates to a technology of switching the combination of temperature sensors and cooling fans in accordance with a result of identifying the type of optical board.

By applying the technology according to the embodiment, it is possible to adaptively switch the number of rotations of the cooling fans in accordance with heat-resistance characteristics and heat-generation characteristics of the option board. For example, it is possible to select on a priority basis a device that is to be cooled in accordance with temperature characteristics of the option board to intensively cool the device. Specific exemplary structures for realizing the technology according to the embodiment will hereunder be described in detail.

[Structure of Housing of Information Processing Apparatus 100]

First, the external appearance of an information processing apparatus 100 according to an embodiment of the present invention will be described with reference to FIG. 1. FIG. 1 is an external view of the information processing apparatus 100 according to the embodiment of the present invention.

As shown in FIG. 1, a housing of the information processing apparatus 100 has a substantially rectangular parallelepiped shape. The upper and lower surfaces are wider than the other surfaces. The housing of the information processing apparatus 100 includes a punch hole panel 102, a frame member 104, a central light emitting diode (LED) 106, a power-supply LED 108, a reset switch 110, and a Universal Serial Bus (USB) terminal 112.

The information processing apparatus 100 is a computer, which is called a work station in which a computation chip having higher performance than a low-cost personal computer for individual users is mounted. In particular, the information processing apparatus 100 is, for example, an apparatus used in high-load processing, such as numerical simulation in the field of science and technology, or in three-dimensional rending of audio visual (AV) data.

Accordingly, the information processing apparatus 100 performs an enormous number of computations. Therefore, a Graphics Processing Unit (GPU) or a central processing unit (CPU) operating on the basis of a high clock, having high electrical power consumption, and having high heat-generation performance is installed in the information processing apparatus 100. An enormous number of computations by the information processing apparatus 100 requires a high-capacity storage area. Therefore, a high-capacity semiconductor memory on which high-speed reading and writing operations can be performed is installed in the information processing apparatus 100.

As described above, since the information processing apparatus 100 executes an enormous number of computations, a large load is exerted upon structural elements, such as a bus (for connecting, for example, the CPU, the GPU, or the memory, thereto) or a controller for controlling the operations of various chips. Due to such reasons, the electrical power consumption and the heating value of the information processing apparatus 100 are very high. Therefore, the housing of the information processing apparatus 100 needs to include a heat-discharging mechanism that quickly discharges air, heated in the interior of the housing, to the outside of the housing, and that quickly causes cold air to quickly flow into the housing from the outside of the housing.

Due to such a circumstance, the housing of the information processing device 100 is provided with the punch hole panel 102. The punch hole panel 102 is a plate-like member having a plurality of punch holes disposed at a predetermined interval. The punch holes have a predetermined size and shape. The punch hole panel 102 is disposed so as to cover a portion of or the entire front surface of the housing of the information processing apparatus 100. For example, the punch holes, formed in the punch hole panel 102, each have, for example, a substantially hexagonal shape, and are provided at predetermined intervals so as to form a honeycomb structure.

The punch hole panel 102 has an inlet for allowing air to flow into the interior of the information processing apparatus 100. The air that has flown in from the punch hole panel 102 is forcefully discharged from an outlet, formed in the rear surface of the housing, by cooling fans, provided in the interior of the housing of the information processing apparatus 100. At this time, air that is warmed by heat dissipation of heating elements, provided in the interior of the housing of the information processing apparatus 100, is discharged from the rear surface of the housing. A reduction in air pressure in the interior of the housing, caused by discharging air from the rear surface of the housing of the information processing apparatus 100, causes cold air to flow in from the punch hole panel 102. In this way, the interior of the housing of the information processing apparatus 100 is ventilated.

At the back side of the punch hole panel 102, the central LED 106 that emits light towards an outer side of the housing from the housing of the information processing apparatus 100 is provided. In addition, the frame member 104 is formed so as to surround the punch hole panel 102. The frame member 104 is provided with the power-supply LED 108 and the reset switch 110. Further, the USB terminal 112 is provided at the front surface of the housing of the information processing apparatus 100. The housing of the information processing apparatus 100 is formed of, for example, a metallic member (such as an aluminum or an iron member) or a plastic member.

The central LED 106 indicates an operation state of the information processing apparatus 100 by, for example, its light-emission color or by flashing. When the information processing apparatus 100 is incorporated in a parallel processing system 1, the central LED 106 provides more useful functions. When the power-supply LED 108 is turned on, this indicates that a power supply is turned on, whereas, when the power-supply LED 108 is turned off, this indicates that the power supply is turned off. The reset switch 110 is a user interface for forcefully re-starting the information processing apparatus 100. The USB terminal 112 is set so as to extend through the punch hole panel 102 to allow connection of an external device.

[Exemplary Structure of Parallel Processing System 1]

Figure 2:
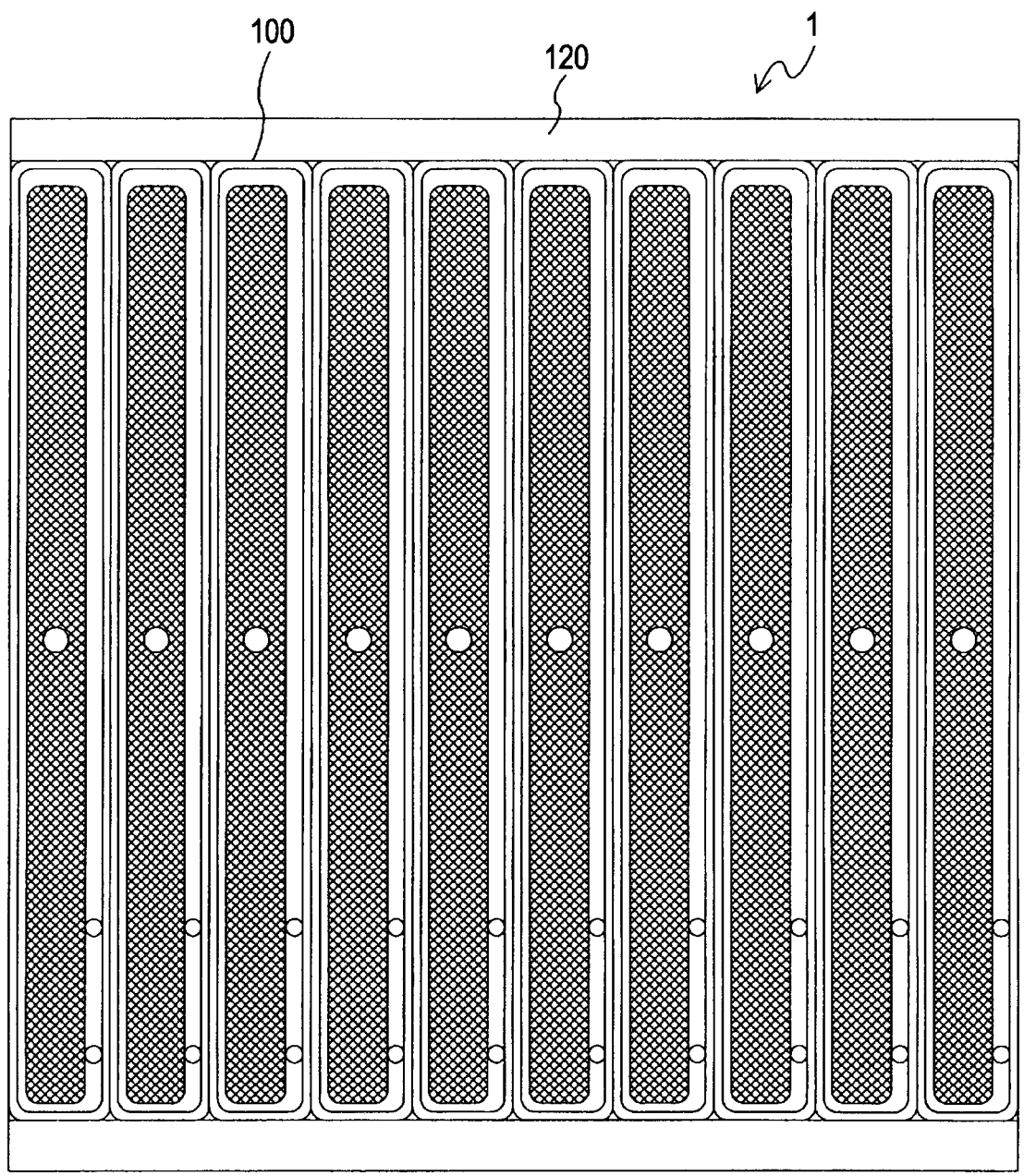
FIG. 2 is an external view of a parallel processing system according to the embodiment.

Next, the structure of the parallel processing system 1 according to the embodiment will be described with reference to FIG. 2. FIG. 2 is an external view of the parallel processing system 1 according to the embodiment.

As described above, the information processing apparatus 100 according to the embodiment is a work station used in high-load processing. Therefore, when executing particularly high-load processing, such as three-dimensional rendering of AV data or computations in science and technology, the parallel processing system 1, in which a plurality of information processing apparatuses 100 are connected to each other in parallel, is frequently used. In this case, as shown in FIG. 2, the plurality of information processing apparatuses 100 are accommodated in a rack 120, are connected to each other by a high-speed network, and are used as the parallel processing system 1. As the high-speed network, for example, a millinet, a fiber channel, or a high-speed Ethernet (trademark) is used.

As shown in FIG. 2, in the parallel processing system 1, each information processing apparatus 100 is set on a vertical surface in the rearward direction of the rack 120 so that punch hole panels 102 are disposed in a row along a short-side direction. Therefore, even if the plurality of information processing apparatuses 100 are disposed in parallel at the rack 120, since the punch hole panels 102 (which are inlets) are not blocked, the information processing apparatuses 100 do not lose their suction/discharge capabilities. Since central LEDs 106 are set so as to be easily visible, even after the information processing apparatuses 100 are set at the rack 120, a user can easily know operation states of the information processing apparatuses 100.

For example, when a power supply of the information processing apparatuses 100 is turn off, the central LEDs 106 are turned off; when the information processing apparatuses 100 are operating normally, the central LEDs 106 are turned on with a blue color; and, when an abnormality occurs in any of the information processing apparatuses 100, the corresponding central LED 106 is turned on with a red color. When such a structure is used, a user can easily identify the abnormal information processing apparatus 100 by confirming the central LED 106 of each of the information processing apparatuses 100. Obviously, the method of providing information by the central LEDs 106 is not limited to the method of using the aforementioned color identification pattern. For example, information may also be provided on the basis of light emission (flashing) in an arbitrarily periodic pattern. These light-emission controlling operations are performed by a system controller 310 (described later).

[Cooling Structure of Information Processing Apparatus 100]

Figure 3:
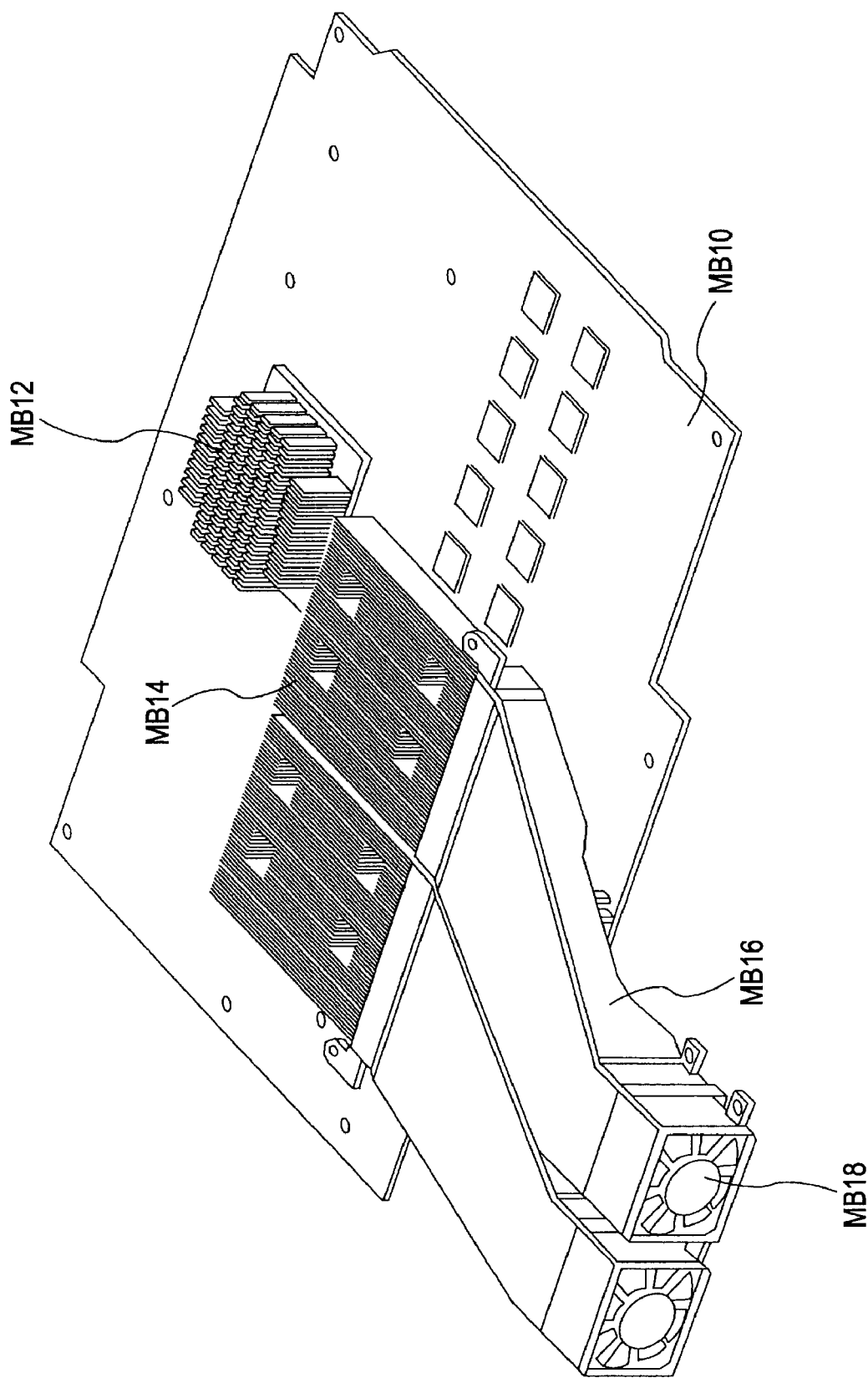
FIG. 3 illustrates an exemplary cooling structure of the information processing apparatus according to the embodiment.
Figure 4:
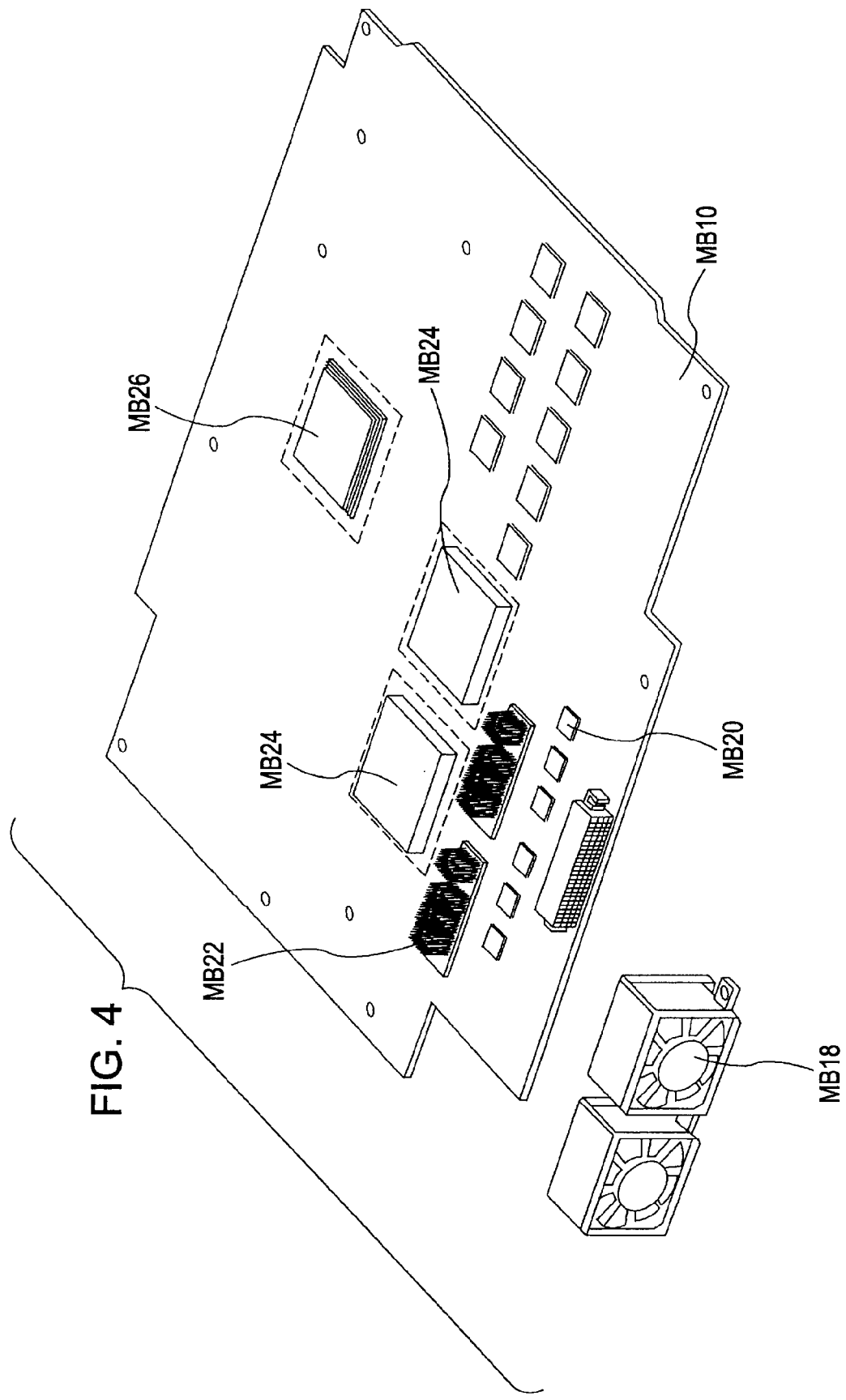
FIG. 4 illustrates an exemplary structure of a board of the information processing apparatus according to the embodiment.

The internal structure of the information processing apparatus 100 according to the embodiment will be simply described with reference to FIGS. 3 and 4. FIG. 3 illustrates an exemplary cooling structure of the information processing apparatus 100 according to the embodiment. FIG. 4 illustrates an exemplary structure of a board of the information processing apparatus 100 according to the embodiment.

As shown in FIG. 3, the cooling structure of the information processing apparatus 100 primarily includes heating sinks MB12 and MB14, cooling ducts MB16, and cooling fans MB18, all of which are provided on a board MB10.

The board MB10 is a wiring printed board. A plurality of integrated circuit (IC) chips are mounted to the board MB10 (see FIG. 4). These IC chips are exemplary heating elements in the information processing apparatus 100. Therefore, the heat sinks MB12 and MB14 are set on the IC chips having large heating values. The shapes and sizes of the heat sinks MB12 and MB14 are determined in accordance with the heating values of the IC chips that are cooled and the size of a setting area. For increasing cooling efficiencies of the IC chips provided below the heat sinks MB14, the cooling ducts MB16 and the cooling fans MB18 are connected to the heat sinks MB14.

The cooling fans MB18 face the front surface of the housing of the information processing apparatus 100, and rotate to allow outside air to flow into the information processing apparatus 100 through the punch hole panel 102 (shown in FIG. 1). When cold air flows into the cooling ducts MB16 from the outside by the cooling fans MB18, the air that has flown into the information processing apparatus 100 through the cooling ducts MB16 is supplied to the heat sinks MB14. Then, the supplied air is cooled by fins of the heat sinks MB14. As a result, heat of the IC chips that has been conducted to the fins of the heat sinks MB14 is cooled by the air, so that the heated IC chips can be efficiently cooled.

Air heated by the heat of the heat sinks MB14 is discharged to the outside of the housing through the outlet in the rear surface of the housing of the information processing apparatus 100. Here, the cooling structure may be such that the heat sinks MB12 is cooled by air flown out towards the outlet. In addition, the cooling structure may be such that a branch tube is provided at the cooling ducts MB16, and a portion of passing outside air is supplied to the IC chips positioned below the cooling ducts MB16.

Here, an exemplary structure of the information processing apparatus 100 resulting from removing the cooling ducts MB16 and the heat sinks MB12 and MB14 on the board MB10 is shown in FIG. 4. As described above, IC chips MB20, MB24, and MB26 are mounted to the board MB10. For example, the cooling heat sinks MB14 are placed on the IC chips MB24. The cooling heat sinks MB12 are placed on the IC chip MB26. The IC chips MB20 are cooled by air which has been branched from the cooling ducts MB16.

The small heat sinks MB22 are placed on small IC chips. For example, as with the IC chips MB24, a cooling structure including a combination of heat sinks MB14 and cooling ducts MB16 is used at a processor unit 302 (see FIG. 5) having a relatively high heating value. A cooling structure, such as that of the IC chip MB26 and that of the IC chips MB20, is used for, for example, the system controller 310 having a heating value that is lower than that of the processor unit 302. Although, with reference to FIGS. 3 and 4, the cooling structure is described using the IC chips placed on the board MB10 as examples, a similar cooling structure may also be applied to a memory 306 (see FIG. 5) having a relatively high heating value.

[Structure of Hardware of Information Processing Apparatus 100]

Figure 5:
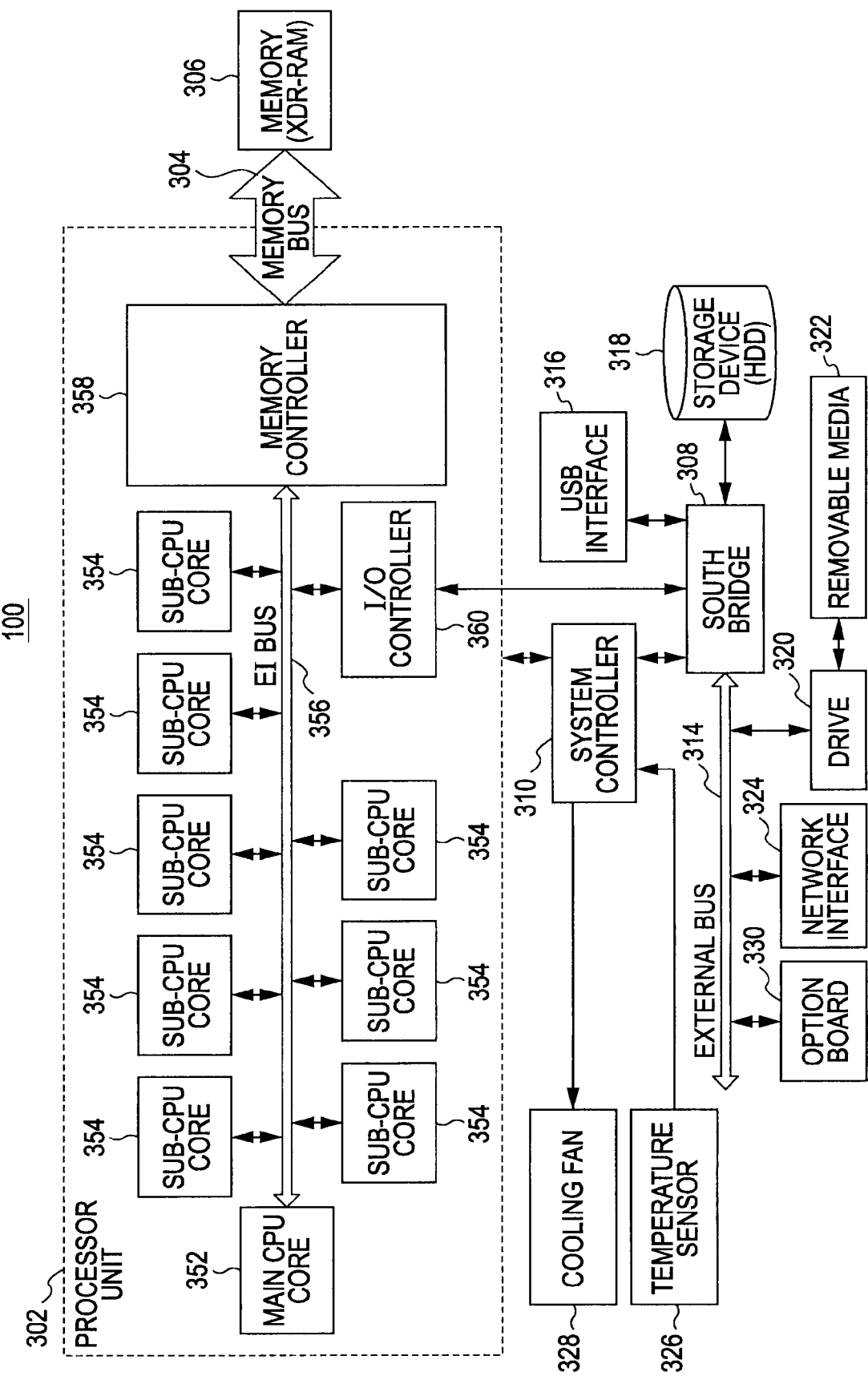
FIG. 5 illustrates an exemplary structure of hardware of the information processing apparatus according to the embodiment.

The structure of hardware of the information processing apparatus 100 according to the embodiment will be described with reference to FIG. 5. FIG. 5 illustrates an exemplary structure of the hardware of the information processing apparatus 100 according to the embodiment.

(Exemplary Structure)

As shown in FIG. 5, the information processing apparatus 100 primarily includes the processor unit 302, a memory bus 304, the memory 306, a south bridge 308, the system controller 310, an external bus 314, a USB interface 316, a storage device 318, a drive 320, a network interface 324, a temperature sensor 326, a cooling fan 328, and an option board 330.

The processor unit 302 includes a main CPU core 352, a plurality of sub-CPU cores 354, an Element Interconnect (EI) bus 356, a memory controller 358, and an I/O controller 360. The main CPU core 352, the plurality of sub-CPU cores 354, the memory controller 358, and the I/O controller 360 are connected to each other through the high-speed EI bus 356. The memory controller 358 and the memory 306 are connected to each other by the memory bus 304. The main CPU core 352 and the plurality of sub-CPU cores 354 access the memory 306 through the memory controller 358.

The main CPU core 352 is a general-purpose microcomputer that executes a basic program of, for example, firmware or an operating system (OS). The firmware executes the function of controlling a device connected to the south bridge 308 through the system controller 310 and the I/O controller 360, and the function of performing abstraction of the structure of hardware or architecture of the processor unit 302. For example, the firmware called Run-Time Abstraction Services (RTAS) is used. The main CPU core 352 is primarily used for, for example, resource management with respect to the sub-CPU cores 354. The main CPU core 352 includes a cash memory (not shown).

For example, as each sub-CPU core 354, a signal processing processor of a Reduced Instruction Set Computer (RISC) type is used. That is, each sub-CPU core 354 is a Single Instruction Multiple Data (SIMD) architecture, and is a high-performance processor that can simultaneously process a plurality of items of data on the basis of one command.

Each sub-CPU core 354 may be called a Synergistic Processing Element (SPE). Each sub-CPU core 354 includes a cash memory (Local Store (LS)) independently of the memory 306.

For the memory 306, for example, an Extreme Data Rate-Random Access Memory (XDR-RAM) having a wide memory bandwidth and capable of high-speed access is used. The south bridge 308 is connected to the main CPU core 352 and the plurality of sub-CPU cores 354 through the I/O controller 360 and the IE bus 356. In addition, the south bridge 308 is connected to the system controller 310. The system controller 310 controls the I/O controller 360 to control, for example, a device connected to the south bridge 308, the temperature sensor 326, and the cooling fan 328.

The system controller 310, the USB interface 316, and the storage device 318 are connected to the south bridge 308. The drive 320, the network interface 324, and the option board 330 are connected to the south bridge 308 through the external bus 314. For example, a Peripheral Components Interconnect Bus (PCI Bus) having a lower speed than the EI bus 356 and the memory bus 304 is used for the external bus 314.

For example, a semiconductor storage device or a hard disc drive (HDD) having a Redundant Arrays of Independent Disks (RAID) structure is used. For example, a communications card or a high-speed network interface board is used for the network interface 324. The communications card is used for connection to, for example, the internet or local area network (LAN).

Removable media 322 are connected to the drive 320. Examples of the removable media 322 connected to the drive 320 include a compact disc (CD), a digital versatile disc (DVD), a mini-disc (MD), a Blu-ray Disc (BD), and a semiconductor memory.

(Exemplary Operation)

Here, an exemplary operation performed when three-dimensional rendering of AV data is executed will be considered. First, the main CPU core 352 assigns the three-dimensional rendering of AV data to the sub-CPU cores 354. Then, the plurality of sub-CPU cores 354 simultaneously execute encoding operations that have been assigned by the main CPU core 352. At this time, an application program used in the encoding operations is developed in the memory 306, and is executed by the processor unit 302. Next, the main CPU 354 causes processing results of the sub-CPU cores 354 to be recorded onto the removable media 322 or in the storage device 318 through, for example, the system controller 310.

(Specific Example of Option Board)

Figure 6:
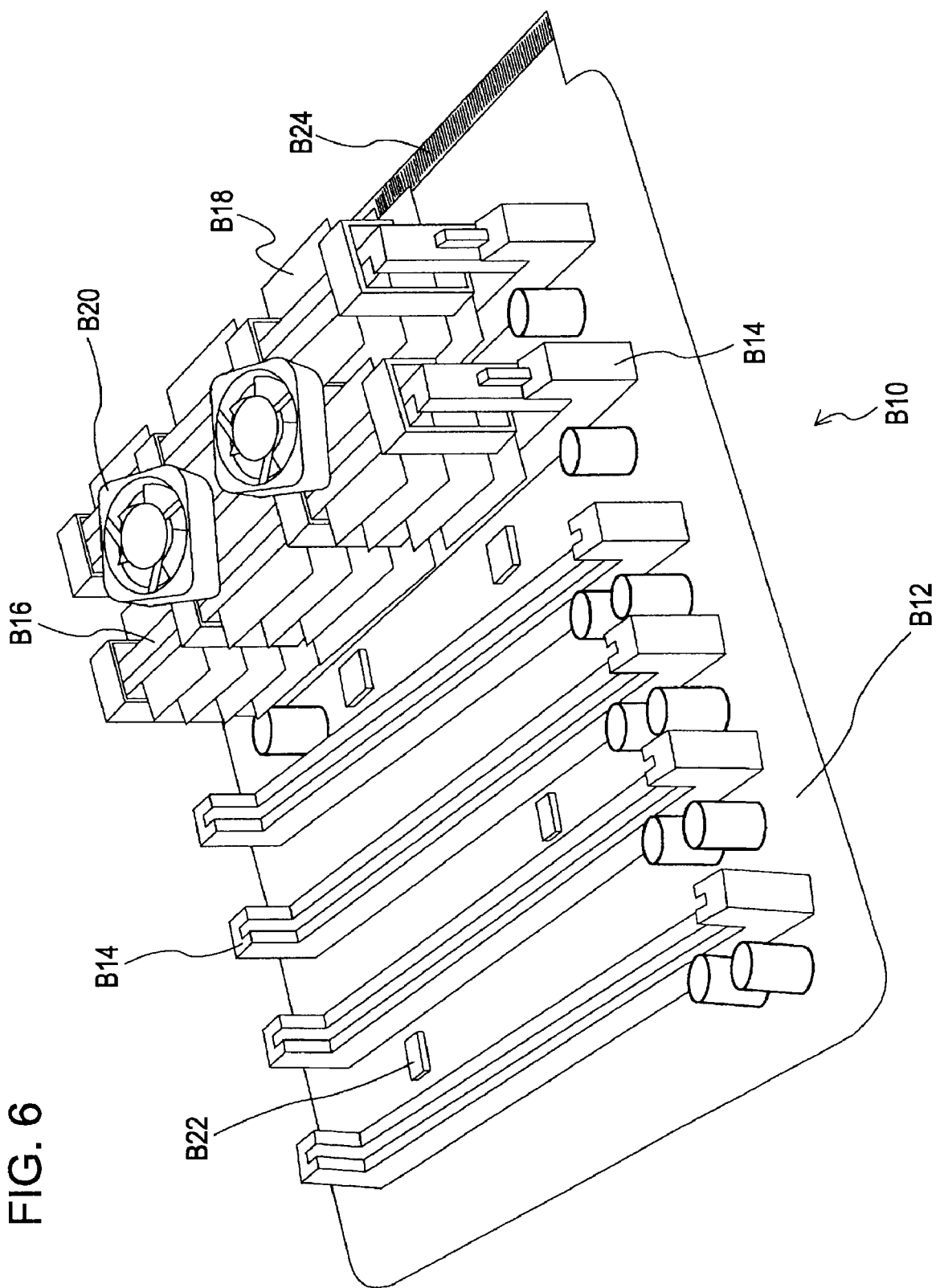
FIG. 6 illustrates an exemplary option board according to the embodiment.

Here, a specific example of the option board will be described with reference to FIG. 6. FIG. 6 is an external view of a memorizer card, which is an example of the option board.

As shown in FIG. 5, for example, the option board 330 can be connected to the information processing apparatus 100 through the external bus 314. The option board 330 is, for example, a LAN card, a graphics card, an image input-output card (such as a TV capture card), a sound input-output card, a modem card, a USB terminal extension card, a Small Computer System Interface (SCSI) card, or a physical computation card.

However, at the information processing apparatus 100 according to the embodiment, it is possible to install riser cards to add processor units 302 or memories 306. These riser cards are connected to the information processing apparatus 100 through a higher-speed bus, instead of through the relatively low-speed external bus 314. Therefore, these riser cards differ from the option board 330. Although not clearly shown, for example, the memory 306 or the processor unit 302 may constitute the option board. In addition, a riser board for adding a memory differing from the memory 306 may be provided.

However, regarding temperature control in the housing, it is possible to apply the cooling technology according to the embodiment to any of the option boards. Obviously, since a CPU board and a memory board are heating devices having large heating values, it is desirable to focus attention on these heating devices and to apply the technology according to the embodiment. Accordingly, an exemplary structure of a memorizer card (option board B10) to which an additional memory is installed is given.

As shown in FIG. 6, the option board B10 is a riser card in which a plurality of memory slots B14 are installed on a base B12. In addition to the memory slots B14, temperature sensors B22 are mounted to the base B12. The base B12 is formed so as to be connected to the information processing apparatus 100 through a connection terminal B24. Memories B16 are mounted to the memory slots B14. Each memory B16 is a memory operating on the basis of a high clock and having high-speed response characteristics. Therefore, the amount of heat generated by each memory B16 is very large. Consequently, a heat-dissipating fin B18 and a cooling fan B20 are mounted as cooling mechanisms to each memory B16.

As described above, the information processing apparatus 100 according to the embodiment is provided with a high-speed computing mechanism for executing high-load processing, and a powerful cooling mechanism for cooling the heated computing mechanism. However, since an air-convection path in the housing changes or the structure of the cooling mechanism changes in accordance with the mounting or removal of the option board described above, cooling control which is adaptive in accordance with option board characteristics is demanded for more efficient cooling. The embodiment has as its purpose the provision of such a cooling control technology, and is related to controlling, for example, the cooling fan 328 and the temperature sensor 326 by the system controller 310.

[Functional Structure of Information Processing Apparatus 100]

Figure 7:
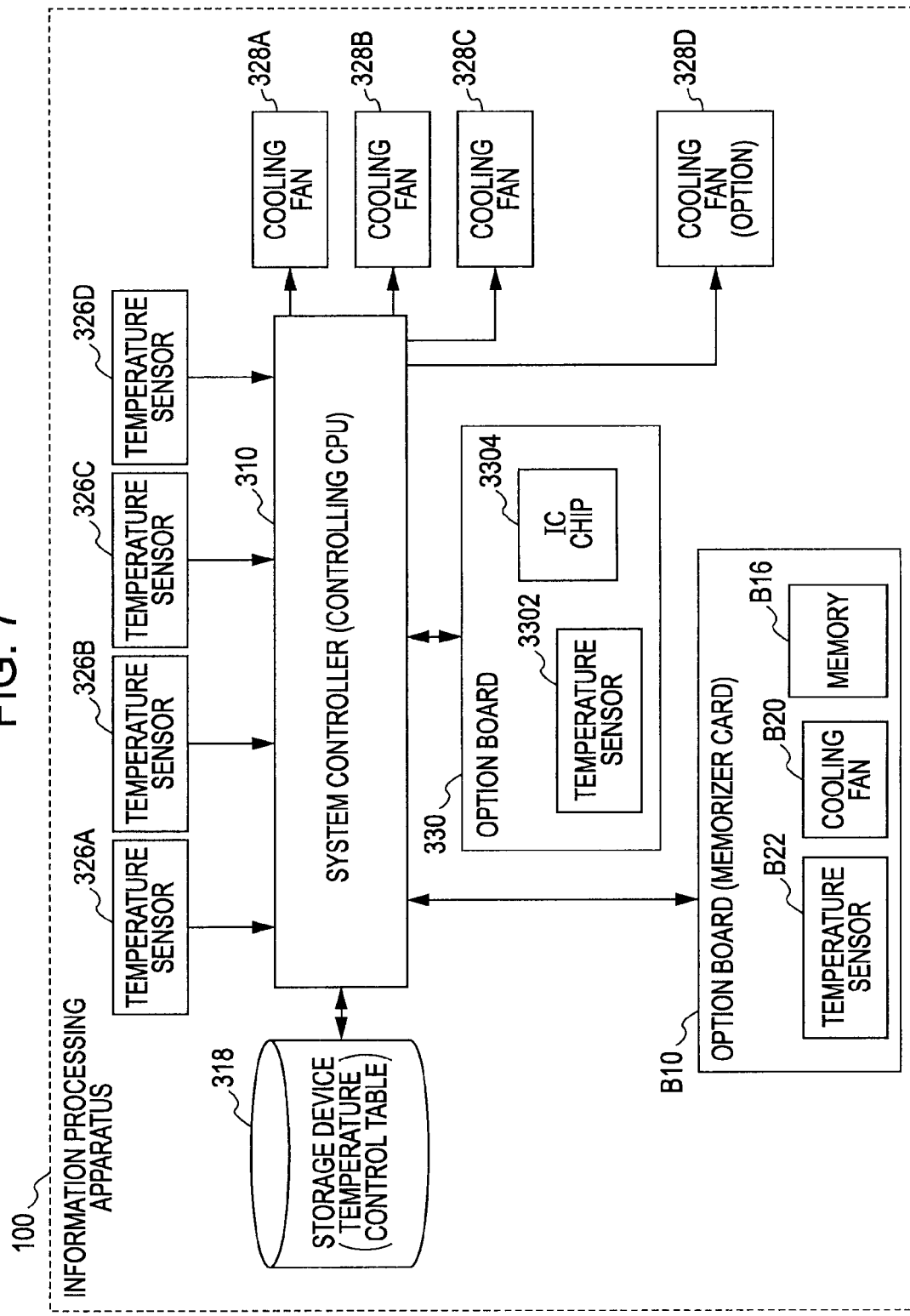
FIG. 7 illustrates a functional structure of the information processing apparatus according to the embodiment.

Here, the functional structure of the information processing apparatus 100 according to the embodiment will be described with reference to FIG. 7. FIG. 7 illustrates the functional structure regarding temperature control of the information processing apparatus 100 according to the embodiment. FIG. 7 shows one example, so that the number and structures of temperature sensors, cooling fans, and option boards are not limited thereto.

As shown in FIG. 7, a temperature control mechanism of the information processing apparatus 100 includes the system controller 31 as the main component. In the example shown in FIG. 7, four cooling fans 328A, 328B, 328C, and 328D and four temperature sensors 326A, 326B, 326C, and 326D (fixed in the interior of the housing) are connected to the system controller 310. The option boards 330 and B10 are connected to the system controller 310. Here, the term "connected" does not necessarily mean "directly connected." The term "connected" may also mean "indirectly connected" as long as signals or data can be transmitted and received.

An IC chip 3304 and a temperature sensor 3302 are mounted to the option board 330. The memory B16, the cooling fan B20, and the temperature sensor B22 are mounted to the option board B10. In this case, the system controller 310 can control the temperature sensor 3302 (mounted to the option board 330), and the cooling fan B20 and the temperature sensor B22 (mounted to the option board B10).

Further, the system controller 310 is connected to the storage device 318, and can read out a temperature control table stored in the storage device 318. The system controller 310 selectively controls the temperature sensors 326A, 326B, 326C, 326D, 3302, and B22, and the cooling fans 328A, 328B, 328C, 328D, and B20 on the basis of the temperature control table stored in the storage device 318.

(Structure of Temperature Control Table)

Figure 8:
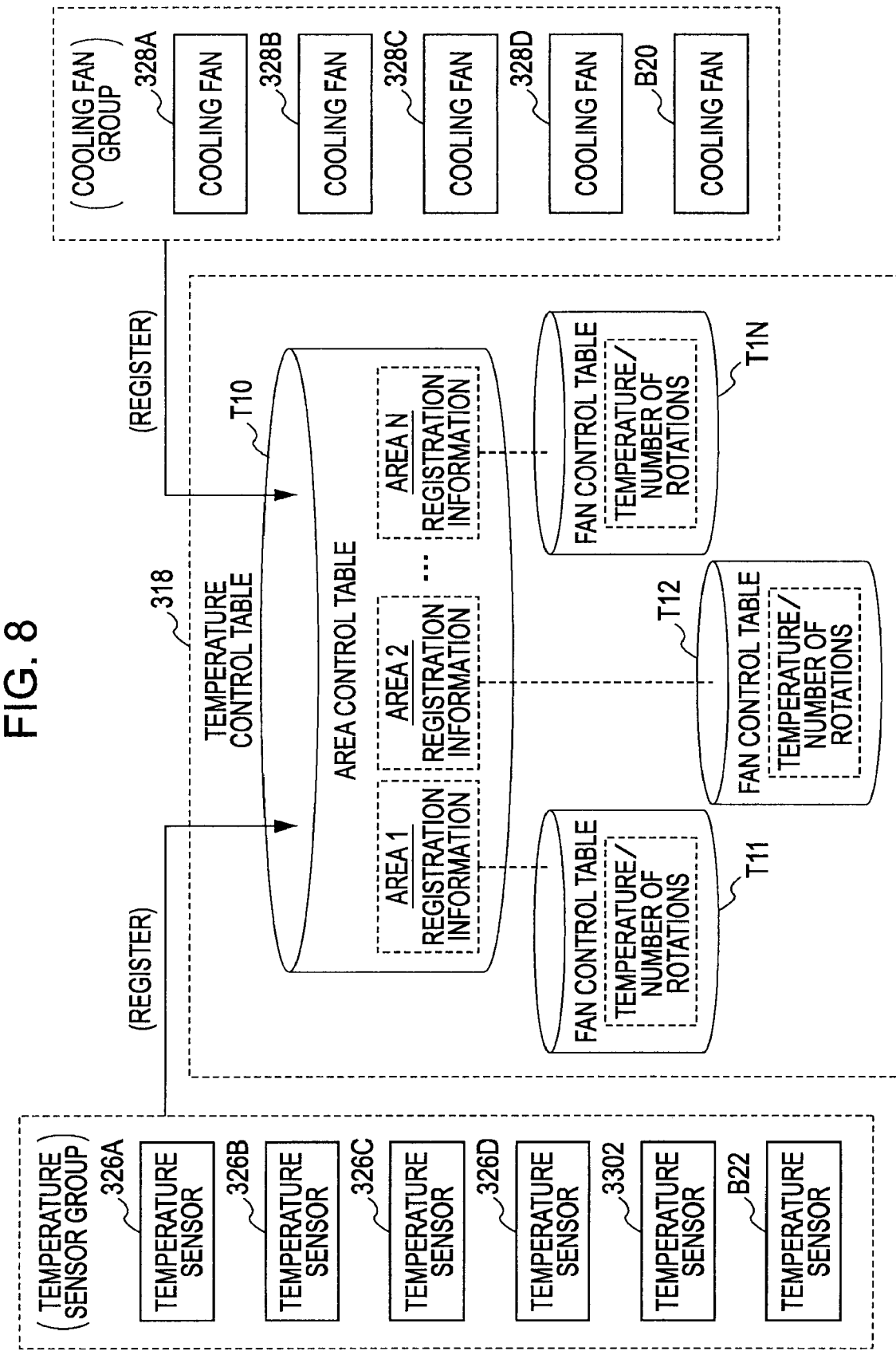
FIG. 8 illustrates an exemplary structure of a temperature control table according to the embodiment.

Here, the structure of the temperature control table according to the embodiment will be described with reference to FIG. 8. FIG. 8 illustrates an exemplary structure of the temperature control table according to the embodiment.

As shown in FIG. 8, the temperature control table according to the embodiment includes an area control table T10 and a plurality of fan control tables T11, T12, ..., T1N. The area control table T10 is only one example of a device control table. The fan control tables T11, T12, ..., T1N are examples of temperature/number-of-rotations tables.

(Exemplary Structure of Area Control Table T10)

The area control table T10 has a plurality of areas, with registration information being registered in each area. This registration information indicates a combination of predetermined temperature sensors and cooling fans selected from a group of temperature sensors and a group of cooling fans connected to the system controller 310. More specifically, the area control table T10 shown in FIG. 9 is used.

FIG. 9 illustrates an exemplary structure of the area control table T10. Referring to FIG. 9, the area control table T10 is provided with an area-name section, a section for temperature-sensor registration information, and a section for cooling-fan registration information. The area-name section is where names of areas for specifying an area is given. The section for temperature-sensor registration information is where temperature sensors that are registered are given for respective areas. The section for cooling-fan registration information is where cooling fans that are registered are given for respective areas. That is, the system controller 310 that controls temperature on the basis of the area control table T10 controls a set of temperature sensors and cooling fans registered for each predetermined area.

Referring to FIG. 9, the temperature sensors 326A, 326B, 326C, and 326D, and the cooling fans 328A, 328B, and 328C are registered in an area 1. The area 1 is set to a basic area. That is, the system controller 310 uses at least a combination of temperature sensors and cooling fans registered in the area 1 (hereunder referred to as "basic setting").

Referring to each section of area 2, a temperature sensor is not registered in the section for temperature-sensor registration information and the cooling fan 328D is only registered in the section for cooling-fan registration information. The area 2 setting is selected when an option board is set in the housing, but the type of the option board is not known. That is, the area 2 is selected when, for example, information regarding whether or not a cooling fan or a temperature sensor is mounted to the option board or information regarding heat-resistance temperature or heating value of the option board cannot be obtained. However, the area 2 setting is selected in addition to the area 1, which is a basic area.

Next, referring to each section of area 3, the temperature sensor 3302 is registered in the section for temperature-sensor registration information, and the cooling fan 328D is registered in the section for cooling-fan registration information. In the example shown in FIG. 8, the temperature sensor 3302 is mounted to the option board 330. Therefore, the information processing apparatus 100 is formed so that the temperature sensor 3302 of the option board 330 is used. However, since a cooling fan is not mounted to the option board 330, the information processing apparatus 100 is formed so that the cooling fan 328D is used. That is, the area 3 is a setting that is selected when the option board 330 is provided. Obviously, the area 1, which is a basic area, is selected along with the area 3 setting.

Next, referring to each section of area N, the temperature sensor B22 is registered in the section for temperature-sensor registration information, and the cooling fans 328C, 328D, and B20 are registered in the section for cooling-fan registration information. In the example shown in FIG. 8, the temperature sensor B22 is mounted to the option board B10. In addition, the cooling fan B20 is mounted to the option board B10. Therefore, the information processing apparatus 100 is formed so that the cooling fan B20 and the temperature sensor B22 (the option board B10) are used. That is, the area N is a setting that is selected when the option board B10 is provided. Obviously, the area 1, which is a basic area, is selected along with the setting of the area N. It is to be noted that the cooling fan 328C is registered in the sections for cooling-fan registration information of both the area 1 and the area N. This point will be discussed later.

As described above, a combination of temperature sensors and cooling fans according to whether or not an option board is provided and the type of option board is registered in each area. The system controller 310 selects a predetermined area in accordance with whether or not an option board is provided and with the type of option board, to control the temperature sensor/temperature sensors and cooling fan/cooling fans registered in the area. The structure of the area control table T10 is not limited thereto, so that it is possible to register other combinations of temperature sensors and cooling fans considering various states.

(Exemplary Structure of Fan Control Tables)

Referring again to FIG. 8, the fan control tables T11, T12, . . . , T1N corresponding to the respective areas of the area control table T10 are shown. The number of rotations of cooling fans and temperature ranges are made to correspond to each other and are given in the respective fan control tables T11, T12, . . . , T1N. After selecting an area of the area control table T10 on the basis of, for example, a setting state of the option board, the fan control table corresponding to this area is referred to.

The system controller 310 controls the number of rotations of the cooling fan/cooling fans on the basis of the corresponding fan control table. At this time, the system controller 310 controls the number of rotations of the cooling fan/cooling fans registered in the selected area on the basis of a measured temperature/measured temperatures of the temperature sensor/temperature sensors registered in the corresponding area. Therefore, the system controller 310 can dynamically change the combination of temperature sensors and cooling fans in accordance with, for example, the setting state of the option board, and to dynamically switch the control characteristic of each cooling fan.

Here, specific structures of the fan control tables will be described with reference to FIGS. 10A to 10D.

First, FIG. 10A will be referred to. FIG. 10A illustrates an exemplary structure of the fan control table T11 corresponding to the area 1. As shown in FIG. 10A, the fan control table T11 has a control-level section, a temperature-range section, and a section for the number of rotations of cooling fans. The temperature-range section has an upper-limit temperature section and a lower-limit temperature section. The number of rotations of cooling fans is given in percent with respect to a maximum number of rotations. Obviously, in the embodiment, the methods of indicating the temperature range and the number of rotations of cooling fans are not limited thereto. As long as the relationship between the temperature range and the number of rotations of cooling fans is indicated, any method of indication may be applied. This applies to FIGS. 10B to 10D.

The description of the indications in the fan control table T11 shown in FIG. 10A will be supplemented. The temperature ranges in the fan control table T11 of control levels overlap each other. For example, the temperature range of control level 1 is from −128° C. to 60° C., and the temperature range of control level 2 is from 50° C. to 70° C. Therefore, in both control levels, the range of from 50° C. to 60° C. overlap. This is because, when the measured temperature fluctuates at a boundary portion of the temperature range, the number of rotations of cooling fans is not frequently changed. This will hereunder be described in more detail.

The lower-limit temperature of each temperature range is a threshold value that is referred to when the measured temperature drops. For example, when the measured temperature drops from 70° C. and reaches 60° C., the control level 3 is changed to the control level 2. Further, when the measured temperature drops to 50° C., the control level 2 changes to the control level 1. The upper-limit temperature of each temperature range is a threshold value that is referred to when the measured temperature rises. For example, when the measured temperature rises from 40° C. and reaches 60° C., the control level 1 changes to the control level 2. Further, when the measured temperature rises to 70° C., the control level 2 changes to the control level 3. Accordingly, the upper-limit temperature and the lower-limit temperature of each temperature range are threshold values that are referred to in accordance with the rising/falling of the measured temperature.

In accordance with this, the overlapping temperature range of the control level 1 and the control level 2 will be considered. If the upper-limit temperature of the control level 1 is set to 50° C. (=lower-limit temperature of the control level 2), when the measured temperature fluctuates between 49° C. to 51° C., the number of rotations of cooling fans is frequently switched between 50% and 75%. Such frequent switching of the number of rotations applies an excess load on the system controller 310, and to also apply a large load to a driving motor of the cooling fans. As a result, the life of the cooling fans is reduced, thereby reducing the reliability of the cooling mechanism.

As shown in the example shown in FIG. 10A, when the overlapping temperature range in the temperature ranges of the control levels is provided, even if the measurement range is reduced to 59° C. immediately after it exceeds 60° C., the lower-limit temperature 50° C. of the control level 2 is not reached, so that the state of the control level 2 (the number of rotations=75%) is maintained. As a result, it is possible to prevent an excess load from being applied to, for example, the driving motor of the cooling fans without the aforementioned frequent switching of the number of rotations.

Next, FIGS. 10B to 10D will be referred to. FIG. 10B illustrates an exemplary structure of the fan control table T12 corresponding to the area 2. The fan control table T12 is a table for controlling the number of rotations of the cooling fan 328D (see FIG. 9) registered in the area 2. FIG. 10C illustrates an exemplary structure of the fan control table T13 corresponding to the area 3. The fan control table T13 is a table for controlling the number of rotations of the cooling fan 328D (see FIG. 9) registered in the area 3. However, the temperature ranges of the fan control table T13 are for measured temperatures of the temperature sensor 3302 (see FIG. 9) of the option board 330 registered in the area 3.

FIG. 10D illustrates an exemplary structure of the fan control table TiN corresponding to the area N. The fan control table TiN is a table for controlling the number of rotations of the cooling fans 328C, 328D, and B20 (see FIG. 9) registered in the area N. However, the temperature ranges of the fan control table TiN are for measured temperatures of the temperature sensor B22 (see FIG. 9) of the option board B10 registered in the area N.

As already discussed, the area N is selected along with the area 1, which is a basic area. Therefore, a method of determining the number of rotations of the cooling fan 328C registered in both the areas 1 and N is demanded. In this case, in the embodiment, among the number of rotations determined on the basis of the fan control table T11 and the number of rotations determined on the basis of the fan control table T1N, the larger one of the numbers of rotations is selected, to control the cooling fan 328C at this number of rotations.

As described above, the system controller 310 selects the temperature sensor/temperature sensors and the cooling fan/cooling fans on the basis of the temperature control table recorded in the storage device 318, to control the cooling fan/cooling fans on the basis of measured temperature/measured temperatures of the temperature sensor/temperature sensors. In particular, the combination of temperature sensors and cooling sensors is dynamically switched in accordance with, for example, the setting state and type of option board. The number of rotations of the cooling fan/cooling fans is controlled with each combination. The functional structure of the system controller 310 related to these controlling operations will be described in more detail.

(Functional Structure of System Controller 310)

Figure 11:
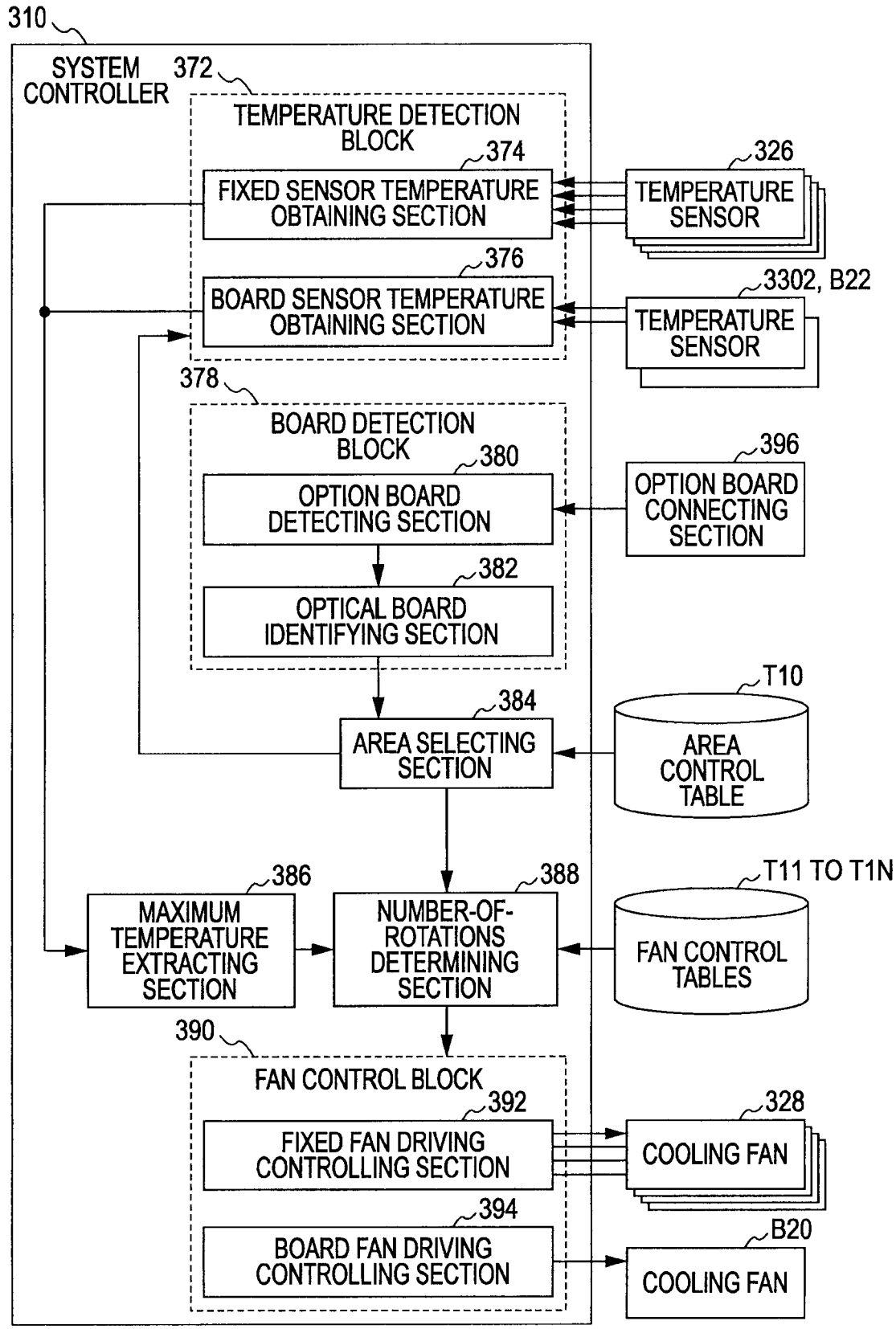
FIG. 11 illustrates a functional structure of a system controller according to the embodiment.

The functional mechanism of the system controller 310 according to the embodiment will hereunder be described with reference to FIG. 11. FIG. 11 illustrates the functional structure of the system controller 310 according to the embodiment.

As shown in FIG. 11, the system controller 310 primarily includes a temperature detection block 372, a board detection block 378, an area selecting section 384, a maximum-temperature extracting section 386, a number-of-rotations determining section 388, and a fan control block 390.

(Temperature Detection Block 372)

The temperature detection block 372 includes a fixed sensor temperature obtaining section 374 and a board sensor temperature obtaining section 376. The fixed sensor temperature obtaining section 374 obtains temperatures measured by the temperature sensors 326. The board sensor temperature obtaining section 376 obtains temperatures measured by the temperature sensors 3302 and B22. The temperature detection block 372 inputs to the maximum-temperature extracting section 386 the temperature measured by the temperature sensor specified by the area selecting section 384 (described later). At this time, the temperature detection block 372 may be formed so as to obtain the temperature only from the temperature sensor specified by the area selecting section 384.

(Board Detection Block 378)

The board detection block 378 includes an option board detecting section 380 and an option board identifying section 382. The option board detecting section 380 is an example of a device detecting section. The option board identifying section 382 is an example of a device determining section.

The option board detecting section 380 detects whether or not an option board is connected to an option board connection section 396. Although not clearly shown in the hardware structure shown in FIG. 5, the option board connection section 396 is a connecting unit used for connecting the option board to the information processing apparatus 100.

Further, the option board detecting section 380 obtains identification information, which identifies the type of option board, from the option board connected to the option board connection section 396. The identification information obtained by the option board detecting section 380 is input to the option board identifying section 382.

The option board identifying section 382 identifies the type of option board connected to the option board connection section 396, on the basis of the identification information input from the option board detecting section 380. At this time, the option board identifying section 382 refers to database (not shown), in which identification information of predetermined option boards is stored, and identifies the type of option board connected to the option board connection section 396. The result of identification by the option board identifying section 382 is input to the area selecting section 384.

Examples of the identification result include "type of predetermined option board," "unknown option board," and "no option board." When identification information is not input from the option board detecting section 380, the result "no option board" is output. The embodiment is not limited thereto, so that, in addition to information regarding the type of predetermined option board, characteristic information indicating heat-resistance characteristics or heat-generation characteristics of the option board may be input to the area selecting section 384. Examples of the characteristic information are "high heating value," "low heating value," "high heat resistance," and "low heat resistance."

(Area Selecting Section 384)

The area selecting section 384 refers to the area control table T10, and selects an area corresponding to the result of identification of the option board by the option board identifying section 382. Information of the area selected by the area selecting section 384 is input to the temperature detection block 372 and to the number-of-rotations determining section 388. However, the temperature detection block 372 may be formed so that only information of a temperature sensor/temperature sensors registered in the selected area is input thereto. The area selecting section 384 is an example of a sensor selecting section.

For example, from the area control table T10 illustrated in FIG. 9, the area selecting section 384 selects the area 1, which is a basic setting. When an identification result indicating an unknown option board is input, the area selecting section 384 selects the area 2 as well as the area 1. When an identification result indicating the option board 330 is input, the area selecting section 384 selects the area 3 as well as the area 1. When an identification result indicating the option board B10 is input, the area selecting section 384 selects the area N as well as the area 1.

When an identification result indicating an option board having a high heating value is input, the area selecting section 384 selects an area corresponding to the identification result. For example, when an identification result indicating an option board having a "high heating value" and "high heat resistance" is input, the area selecting section 384 selects an area corresponding to a not-so-powerful cooling structure. In contrast, when the option board having a "low heating value" and "low heat resistance" is input, the area selecting section 384 selects an area corresponding to a relatively powerful cooling structure. Accordingly, the area selecting section 384 may be formed so as to select a suitable area in accordance with the characteristics of the option board.

(Maximum-Temperature Extracting Section 386)

The maximum-temperature extracting section 386 extracts the maximum measured temperature from among measured temperatures input from the temperature detection block 372. Here, the maximum-temperature extracting section 386 may extract the maximum measured temperature from among all measured temperatures input from the temperature detection block 372, or extract the maximum measured temperature from among measured temperatures of the respective areas. "The maximum measured temperature from among measured temperatures of the respective areas" means the maximum measured temperature from among the measured temperatures of the temperature sensors registered in the respective areas. The maximum measured temperature extracted by the maximum-temperature extracting section 386 is input to the number-of-rotations determining section 388.

(Number-of-Rotations Determining Section 388)

The number-of-rotations determining section 388 determines the number of rotations of the cooling fan/the cooling fans on the basis of the fan control tables T11, . . . , T1N. At this time, the number-of-rotations determining section 388 refers to the corresponding fan control table on the basis of information of the area input from the area selecting section 384. Further, the number-of-rotations determining section 388 determines the number of rotations of the cooling fan/the cooling fans on the basis of the maximum measured temperature input from the maximum-temperature extracting section 386. However, the number-of-rotations determining section 388 determines the number of rotations of the cooling fans registered in accordance with the respective areas. The number of rotations determined by the number-of-rotations determining section 388 is input to the fan control block 390. The number-of-rotations determining section 388 is an example of a fan controlling section.

For example, the case in which information indicating the areas 1 and 3 is input from the area selecting section 384 to the number-of-rotations determining section 388 and the temperature detection block 372 will be considered (see FIGS. 9, 10A and 10C). In this case, the temperatures measured by the temperature sensors 326A, 326B, 326C, 326D, and 3302 are input from the temperature detection block 372 to the maximum-temperature extracting section 386. The maximum-temperature extracting section 386 extracts a maximum value (first maximum temperature) of the temperatures measured by the temperature sensors 326A, 326B, 326C, and 326D registered in the area 1, and a temperature (second maximum temperature) measured by the temperature sensor 3302.

The number-of-rotations determining section 388 refers to the fan control table T11, selects the number of rotations of the cooling fan corresponding to the first maximum temperature, sets the number of rotations as the number of rotations of the cooling fans 328A, 328B, and 328C corresponding to the area 1, and inputs the number of rotations to the fan control block 390. In addition, the number-of-rotations determining section 388 refers to the fan control table T13, selects the number of rotations of the cooling fan corresponding to the second maximum temperature, sets the number of rotations as the number of rotations of the cooling fan 328D corresponding to the area 3, and inputs the number of rotations to the fan control block 390.

(Fan Control Block 390)

The fan control block 390 includes a fixed fan driving controlling section 392 and a board fan driving controlling section 394. The fixed fan driving controlling section 392 controls driving of the cooling fans 328A, 328B, 328C, and 328D provided in the housing. The board fan driving controlling section 394 controls driving of the cooling fan B20 provided at the option board B10. The fan control block 390 controls driving of a corresponding cooling fan on the basis of the number of rotations input from the number-of-rotations determining section 388. The fan control block 390 is an example of a fan controlling section.

The functional structure of the information processing apparatus 100 according to the embodiment is described above. As mentioned above, using the system controller 310, the information processing apparatus 100 can dynamically switch a cooling structure in accordance with the characteristic, type, and setting state of an option board. In particular, identifying the option board makes it possible to cool on a priority basis the option board having a high heating value or an option board having a low heat-resistance temperature. Noise generated by a cooling fan can be reduced by controlling the number of rotations of the cooling fan in steps. In addition, when a temperature sensor and a cooling fan is mounted to an option board, temperature control considering the cooling structures thereof is realized.

[Method of Controlling Cooling Fan]

Figure 12:
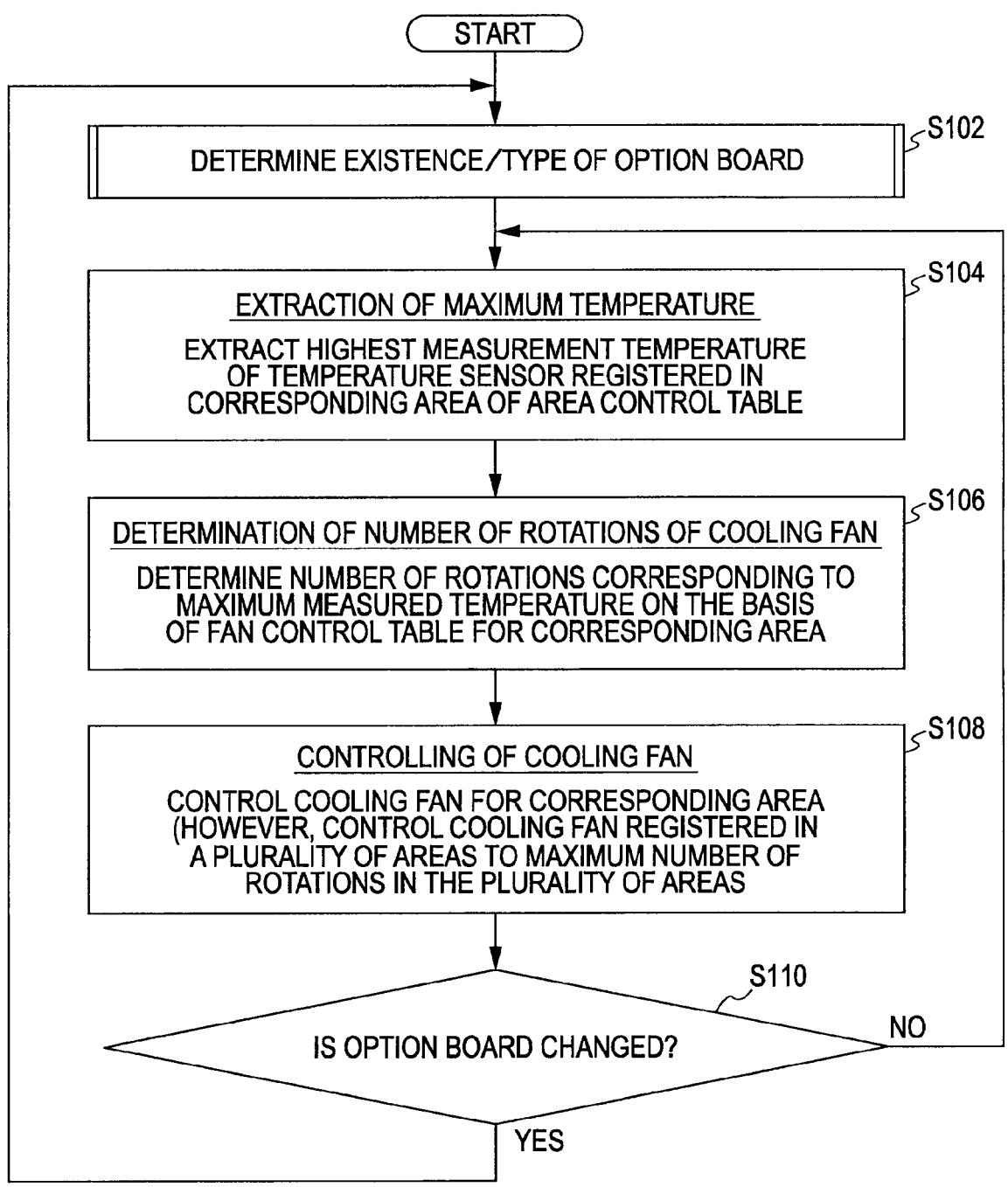
FIG. 12 is a flowchart of a method of controlling a cooling fan according to the embodiment.

Next, a method of controlling a cooling fan according to the embodiment will be described with reference to FIG. 12. FIG. 12 is a flowchart of the method of controlling a cooling fan according to the embodiment. Each step of the method of controlling a cooling fan is executed primarily by the system controller 310.

First, when the board detection block 378 determines the existence/absence of an option board, and determines that an option board is connected, the board detection block 378 determines the type of option board (Step S102). A determination result in Step S102 is input to the area selecting section 384. Then, the area selecting section 384 selects an area in accordance with the determination result. Next, the maximum-temperature extracting section 386 extracts the maximum temperature of measured temperatures obtained at the temperature detection block 372 (Step S104). In this step, the maximum-temperature extracting section 386 extracts the highest measured temperature among the measured temperatures of the temperature sensors recorded in the respective areas of the area control table T10. Information regarding the extracted highest temperature is input to the number-of-rotations determining section 388.

Next, the number-of-rotations determining section 388 determines the number of rotations of the cooling fans (Step S106). In this step, the number-of-rotations determining section 388 determines the number of rotations of the cooling fan corresponding to the maximum measured temperature on the basis of the fan control table of the corresponding area. Information regarding the determined number of rotations is input to the fan control block 390. Next, the fan control block 390 controls the corresponding cooling fan (Step S108). In this step, the fan control block 390 controls the cooling fan of the corresponding area. However, driving of the cooling fan registered in a plurality of areas is controlled on the basis of the maximum number of rotations among a plurality of number of rotations corresponding to these areas.

Next, the board detection block 378 determines whether or not the option board is changed (Step S110). When the option board is changed, the process proceeds to Step S102. In contrast, when the option board is not changed, the process proceeds to Step S104. The phrase "the option board is changed" means that the option board is mounted to or removed from the information processing apparatus 100. In addition, the term "corresponding area" refers to a predetermined area selected in accordance with the determination result in Step S102. Obviously, the number of corresponding areas may be more than one.

Figure 13:
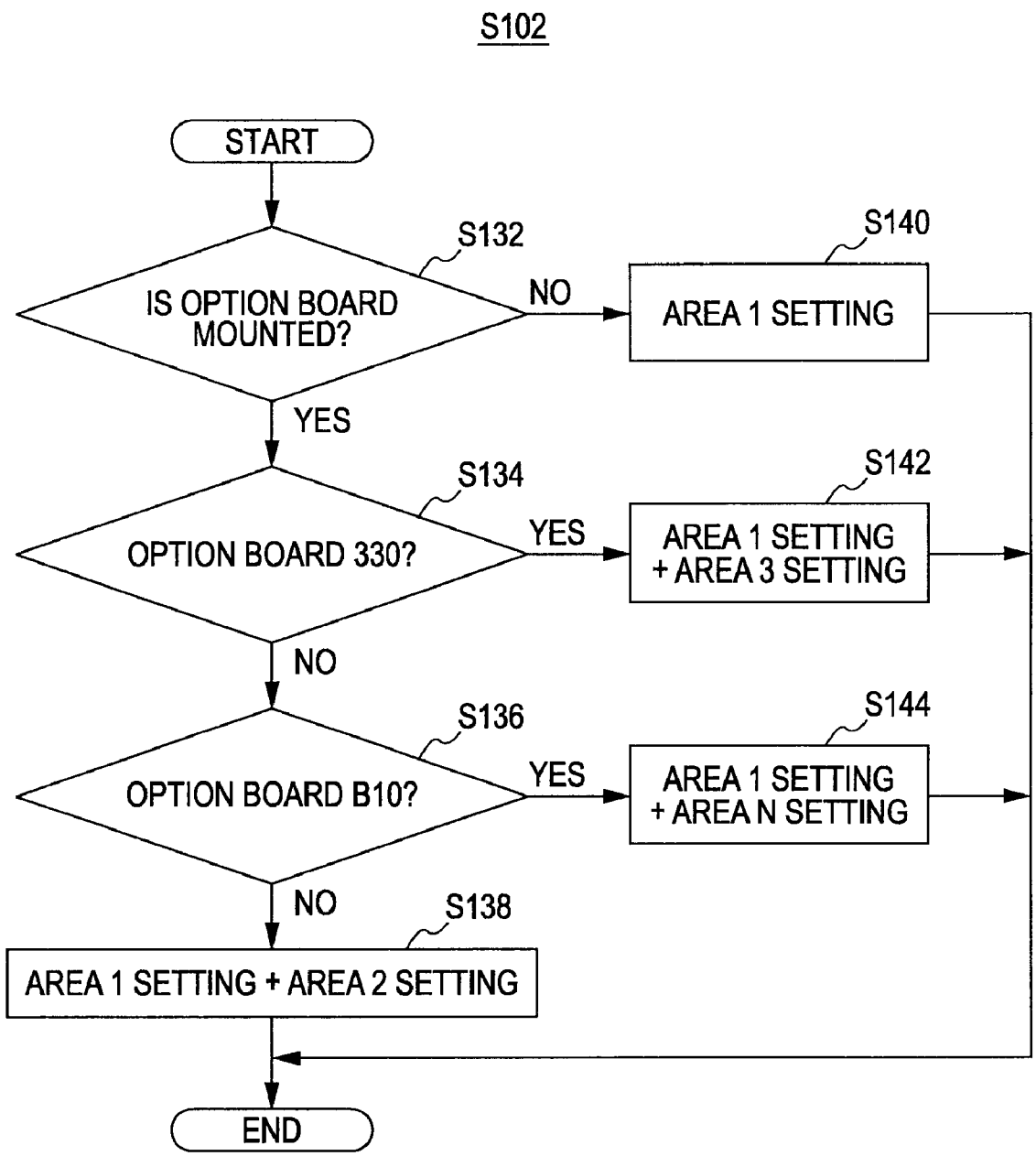
FIG. 13 is a flowchart of the method of controlling the cooling fan according to the embodiment.

Here, with reference to FIG. 13, the step of determining an option board (Step S102) will be described in more detail. FIG. 13 is a flowchart of the step of determining an option board according to the embodiment. The step of determining an option board described below is primarily executed by the board detection block 378 and the area selecting section 384.

First, the board detection block 378 determines whether or not an option board is mounted (Step S132). When an option board is mounted, the process proceeds to Step S134. If it is not mounted, the process proceeds to Step S140. In Step S140, the area selecting section 384 selects the area 1, and setting information of the area 1 is input to the temperature detection block 372 and the number-of-rotations determining section 388. Examples of the setting information include information of registered temperature sensors or cooling fans.

In Step S134, the board detection block 378 determines whether or not the mounted option board is the option board 330 (Step S134). When it is not the option board 330, the process proceeds to Step S136. In contrast, if it is the option board 330, the process proceeds to Step S142. In Step S142, the area selecting section 384 selects the areas 1 and 3, and setting information of the areas 1 and 3 is input to the temperature detection block 372 and the number-of-rotations determining section 388.

In Step S136, the board detection block 378 determines whether the mounted option board is the option board B10 (Step S136). When it is not the option board B10, the process proceeds to Step S138. In contrast, if it is the option board B10, the process proceeds to Step S144. In Step S144, the area selecting section 384 selects the areas 1 and N, and setting information of the areas 1 and N is input to the temperature detection block 372 and the number-of-rotations determining section 388. In Step S138, the area selecting section 384 selects the areas 1 and 2, and setting information of the areas 1 and 2 is input to the temperature detection block 372 and the number-of-rotations determining section 388.

As described above, the board detection block 378 determines whether or not an option board is mounted, and the type of option board, to select an area in accordance with the determination results. Then, the setting information is selected for each selected area, to control the corresponding cooling fans on the basis of the setting information. The area 1, which is a basic area, is set in the areas, so that the area 1 is selected for any determination result. When the option board is of a predetermined type, an area (such as the area 3, area N) is selected in accordance with the type of option board. If the option board is not of a predetermined type, a predetermined area (such as the area 2) is selected.

Although, in the above-described example, the predetermined types of option boards in the determining step are the option board 330 and the option board B10, it is obvious that, for example, a manufacturer or a seller can arbitrarily register the types of option boards. In this case, areas corresponding to the registered types of option boards are set, to control a cooling fan in accordance with a determination result of the board detection block 378.

The present application contains subject matter related to that disclosed in Japan Priority Patent Application JP 2008-084715 filed in the Japanese Patent Office on Mar. 27, 2008, the entire content of which is hereby incorporated by reference.

Although, in the foregoing description, a preferred embodiment of the present invention is described with reference to the attached drawings, the present invention is not limited thereto. It is apparent by those skilled in the art that various modifications and alterations may occur within the category set forth in the scope of the claims, and that, obviously, these modifications and alterations are within the technical scope of the present invention.

For example, in the above-described embodiment, as an option board (which is an example of a heating device), a riser card, to which a memory is mounted, and a communications card, such as a LAN card and a modem card, are given as examples. However, the technical scope of the present invention is not limited thereto. For example, the heating device may be a CPU board, to which an IC chip of, for example, a CPU is mounted; a graphic card, to which a GPU is mounted; or a blade server, to which a set of integrated circuits of the information processing apparatus, mainly a CPU, is mounted.

What is claimed is:

1. An information processing apparatus comprising:
    a device detecting section that detects whether a device that produces heat is mounted in a housing;
    a device determining section that determines a type of the device when the device detecting section detects that the device is mounted in the housing;
    a sensor selecting section that selects a predetermined one of a plurality of temperature sensors provided in the housing in accordance with the determination of whether the device is mounted in the housing and the determined type of the device; and
    a fan controlling section that controls a number of rotations of a cooling fan provided in the housing in accordance with a measured temperature of the temperature sensor selected by the sensor selecting section.

2. The information processing apparatus according to claim 1, wherein when the device detecting section detects that the device is provided in the housing and determines that the device is one having a high heating value or a low heat-resistance temperature, the fan controlling section increases the number of rotations of the cooling fan that is driven for cooling the device.

3. The information processing apparatus according to claim 2, wherein when the device detecting section detects that the device is mounted in the housing and determines that the device includes a temperature sensor, the sensor selecting section selects at least the temperature sensor of the heating device as the predetermined temperature sensor.

4. The information processing apparatus according to claim 3, wherein when the device detecting section detects that the device is mounted in the housing and determines that the device is provided with a cooling fan, the fan controlling section controls at least the number of rotations of the cooling fan of the device.

5. The information processing apparatus according to claim 1, wherein setting items are provided in accordance with the determination of whether the device is mounted in the housing and the type of the device,
    wherein the information processing apparatus further includes a storage section in which a device control table and a temperature/number-of-rotations table are stored for each of the setting items, the device control table including a combination of the cooling fan and the temperature sensors, the temperature/number-of-rotations table including predetermined temperature ranges and the numbers of rotations of the cooling fan, which are made to correspond to each other,
    wherein the sensor selecting section selects the temperature sensor on the basis of the device control table, and
    wherein the fan controlling section controls the number of rotations of the cooling fan on the basis of the temperature/number-of-rotations table, the number of rotations of the cooling fan pertaining to the setting item that is the same as that of the temperature sensor selected by the sensor selecting section.

6. The information processing apparatus according to claim 1, wherein the device detecting section further detects whether the device is mounted to the information processing apparatus via a bus.

7. The information processing apparatus according to claim 1, wherein the device determining section determines the type of the device based on information received from the device indicating the type.

8. The information processing apparatus according to claim 1, wherein the device is one of a network card, a graphics card, an image input-output card, a sound input-output card, a modem card, a USB terminal extension card, a Small Computer System Interface (SCSI) card, and a riser card.

9. A method of controlling a cooling fan, comprising:
    detecting, by an information processing apparatus, whether a device that produces heat is mounted in a housing of the information processing apparatus;
    determining a type of the device when the device is detected to be mounted in the housing;
    selecting a predetermined one of a plurality of temperature sensors provided in the housing in accordance with the determination of whether the device is mounted in the housing and the determined type of the device; and
    controlling a number of rotations of the cooling fan provided in the housing in accordance with a measured temperature of the temperature sensor selected in the step of selecting the sensor.

10. A non-transitory computer readable storage medium having stored thereon a program having instructions that when executed by a processor of a information processing apparatus, causes the processor to perform a method comprising:
    detecting whether a device that produces heat is mounted in a housing of the information processing apparatus;
    determining a type of the device when the device is detected to be mounted in the housing;
    selecting a predetermined one of a plurality of temperature sensors provided in the housing in accordance with the determination of whether the device is provided in the housing and the determined type of the device; and
    controlling a number of rotations of the cooling fan provided in the housing in accordance with a measured temperature of the selected temperature sensor.

* * * * *